United States Patent
Iwamoto

(10) Patent No.: US 8,059,906 B2
(45) Date of Patent: Nov. 15, 2011

(54) IMAGE PROCESSING APPARATUS, IMAGE PROCESSING METHOD, COMPUTER-READABLE MEDIUM AND COMPUTER DATA SIGNAL

(75) Inventor: Yasuhiko Iwamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 791 days.

(21) Appl. No.: 12/173,532

(22) Filed: Jul. 15, 2008

(65) Prior Publication Data

US 2009/0136149 A1    May 28, 2009

(30) Foreign Application Priority Data

Nov. 28, 2007    (JP) .................... 2007-306731

(51) Int. Cl.
*G06K 9/42* (2006.01)
(52) U.S. Cl. ....................................... 382/256
(58) Field of Classification Search .............. 382/100, 382/256, 168, 170, 171, 272; 380/252, 287; 713/176

See application file for complete search history.

(56) References Cited

U.S. PATENT DOCUMENTS

2003/0076979 A1    4/2003    Matsui
2006/0204096 A1*   9/2006    Takebe et al. ............. 382/180

FOREIGN PATENT DOCUMENTS

JP    2002-232698    *   8/2002
JP    A 2002-232698       8/2002

OTHER PUBLICATIONS

New U.S. Application filed on Jul. 15, 2008 in the name of Yasuhiko Iwamoto.

* cited by examiner

*Primary Examiner* — Vu Le
*Assistant Examiner* — Amara Abdi
(74) *Attorney, Agent, or Firm* — Oliff & Berridge, PLC

(57) ABSTRACT

An image processing apparatus includes an extraction unit, a counting unit and an information embedding unit. The extraction unit extracts a circumscribed figure of a pixel block in an image. The counting unit counts contact portions between the circumscribed figure extracted by the extraction unit and the pixel block. The information embedding unit embeds information to be embedded by adjusting a number of the contact portions between the pixel block and the circumscribed figure extracted by the extraction unit based on the number of contact portions counted by the counting unit and the information to be embedded.

9 Claims, 7 Drawing Sheets

(a)  (b)

(a)          (b)

IMAGE PROCESSING APPARATUS, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2007-306731 filed Nov. 28, 2007.

BACKGROUND

1. Technical Field

The invention relates to an image processing apparatus, an image processing method, a computer-readable medium and a computer data signal.

2. Related Art

In the field of an information embedding technology for embedding information in a binary image, there has been proposed a technique of embedding information by dividing an image into plural blocks and inverting pixels in the blocks to adjust the number of black pixels. The expression "embedding information in an image" means modifying the image in accordance with the information (in some cases, the image is not modified) and also means reading the modified image with a scanner and to performing image processing for the read image so as to take out the embedded information from the read image.

SUMMARY

According to an aspect of the invention, an image processing apparatus includes an extraction unit, a counting unit and an information embedding unit. The extraction unit extracts a circumscribed figure of a pixel block in an image. The counting unit counts contact portions between the circumscribed figure extracted by the extraction unit and the pixel block. The information embedding unit embeds information to be embedded by adjusting a number of the contact portions between the pixel block and the circumscribed figure extracted by the extraction unit based on the number of contact portions counted by the counting unit and the information to be embedded.

BRIEF DESCRIPTION OF THE DRAWINGS

Exemplary embodiments of the invention will be described in detail based on the following figures, wherein.

DETAILED DESCRIPTION

Hereinafter, exemplary embodiments of the invention will be described with reference to the accompanying drawings.

Figure 1:
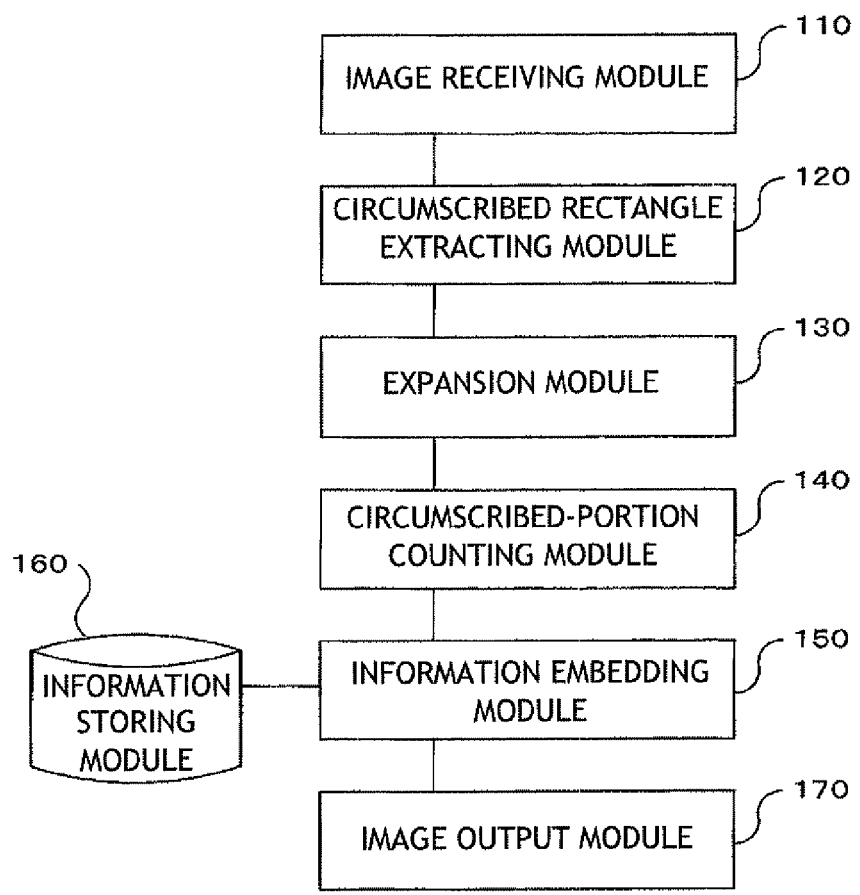
FIG. 1 is a module configuration diagram conceptually showing a configuration example of an exemplary embodiment (information embedding apparatus) of the invention.

FIG. 1 is a module configuration diagram conceptually showing a configuration example of an exemplary embodiment (information embedding apparatus) of the invention.

Here, the term "module" means a component, such as software (computer program) components or hardware, which is logically dividable. Accordingly, the modules in this exemplary embodiment include modules having a hardware configuration, as well as modules in the computer program. Therefore, this exemplary embodiment also serves as description on a computer program, a system, and a method. Here, "store", "cause something to store", and words equivalent thereto are used for the purpose of convenient explanation. When this exemplary embodiment is a computer program, these words mean that information is stored in a memory or that a memory is controlled to store information therein. A module corresponds to a function almost in one to one correspondence. However, actually, one module may be embodied by one program, plural modules may be embodied by one program, or one module may be embodied by plural programs. Plural modules may be executed by one computer, or one module may be executed by plural computers in a distributed or parallel environment. One module may include another module. Also, in the following description, the term "connection" includes logical connection (transmission and reception of data, instruction, a reference relation among data), as well as physical connection.

Also, a system or a device may be embodied by plural computers, hardware structures, or devices connected to each other through a communication device such as a network (including one-to-one communicating connection), or may be embodied by a single computer, a single hardware structure, or a single device. The terms "device" and "system" are used as synonyms.

An image to be processed may include plural images, may be a binary image or a multilevel image (including a color image). Hereinafter, a binary image is mainly exemplified as the image to be processed.

A circumscribed figure means a least figure that surrounds a pixel block. For example, when the figure is a rectangle, it is called a circumscribed rectangle. When the figure is a circle, it is called a circumscribed circle. In this exemplary embodiment, the circumscribed rectangle is exemplified as the circumscribed figure.

The pixel block includes at least a pixel area having 4- or 8-connectivity, and also includes a set of such pixel areas. The set of pixel areas means that plural pixel areas having 4-connectivity or the like are neighboring each other. Here, the "pixel areas neighboring each other" means, for example, pixel areas close to each other in distance, an image area obtained by projecting one line of a sentence vertically or horizontally to extract one character by one character and cutting the line at blank positions, an image area obtained by cutting the line at a constant interval, or the like.

One pixel block often constitutes an image of one character. However, it is not necessary that the pixel block be an image area that a human being can recognize as a character. A part of a character or a pixel area not constituting a character may be the pixel area, and it may be any lump of pixels.

An image embedding apparatus includes an image receiving module 110, a circumscribed rectangle extracting module 120, an expansion module 130, a circumscribed-portion counting module 140, an information embedding module 150, an information storing module 160, and an image output module 170.

The image receiving module 110 is connected to the circumscribed rectangle extracting module 120. The image receiving module 110 receive an image in which information is to be embedded, and sends the received image to the circumscribed rectangle extracting module 120. Specifically, the image receiving module 110 receives an image by a scanner, receives an image from an external device through a communication line such as a facsimile, or receives an image from a memory medium.

The circumscribed rectangle extracting module 120 is connected to the image receiving module 110 and the expansion module 130. The circumscribed rectangle extracting module 120 receives the image from the image receiving module 110, and extracts a circumscribed rectangle of a pixel block in the image. Then, the circumscribed rectangle extracting module 120 sends to the expansion module 130 information (position information of the left-upper corner of a circumscribed rectangle, and the vertical length and the horizontal length of a circumscribed rectangle, and the like) regarding the extracted circumscribed rectangle.

The expansion module 130 is connected to the circumscribed rectangle extracting module 120 and the circumscribed-portion counting module 140. The expansion module 130 receives the information of the circumscribed rectangle from the circumscribed rectangle extracting module 120, performs an expansion process for the pixel block in the circumscribed rectangle, and sends an image which is the expansion result to the circumscribed-portion counting module 140. The expansion process is a process of changing a pixel in question to a black pixel if any black pixel exists in the neighbor (for example, 4-connectivity, 8-connectivity or the like) of the noted pixel. The expansion process may be performed by performing a logical sum operation for an original image and images (four images in the case of the 4-connectivity, eight images in the case of 8-connectivity, or the like) that are obtained by shifting the original image by one pixel.

The circumscribed-portion counting module 140 is connected to the expansion module 130 and the information embedding module 150. The circumscribed-portion counting module 140 receives the expanded image from the expansion module 130, counts the number of contact portions between the expanded image and the circumscribed rectangle extracted by the circumscribed rectangle extracting module 120, and sends the number of contact portions to the information embedding module 150.

The information embedding module 150 is connected to the circumscribed-portion counting module 140, the information storing module 160, and the image output module 170. The information embedding module 150 receives the number of contact portions from the circumscribed-portion counting module 140, reads the information to be embedded from the information storing module 160, and embeds the information by adjusting the number of contact portions between the circumscribed rectangle and the pixel block in the circumscribed rectangle. Here, the adjusting of the number of contact portions includes (i) making a change by increasing or decreasing the number of contact portions and (ii) not changing the number of contact portions (not performing any operation).

The information storing module 160 stores the information to be embedded and sends the information in response to an access from the information embedding module 150.

The image output module 170 is connected to the information embedding module 150. The image output module 170 receives the image in which the information is embedded by the information embedding module 150 and outputs the received image. The outputting of the image includes printing the image by a printer, displaying the image by a display, transmitting the image by the use of a facsimile, and writing the image into an image database.

Operations and functions will be described now with reference to FIGS. 2 to 6.

A process example performed by the image embedding apparatus will be described with reference to the flowchart shown in FIG. 2. The case where information is embedded in a pixel block of "A" in an image will be described as a specific example.

In step S202, the image receiving module 110 receives an image in which information is to be embedded.

In step S204, the circumscribed rectangle extracting module 120 extracts a circumscribed rectangle of a pixel block in the image received in step S202. As shown in FIG. 3(a), a character "A" 300, which is a pixel block, is set as a target. Then, as shown in FIG. 3(b), a circumscribed rectangle 310 of character "A" 300 is extracted.

Figure 4:
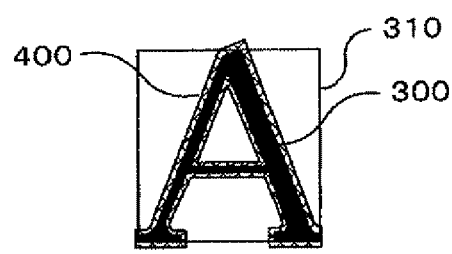
FIG. 4 is a diagram illustrating an example in which an expanding process is performed for a pixel block.

In step S206, the expansion module 130 performs an expansion process for the pixel block in the circumscribed rectangle extracted in step S204. As shown in FIG. 4, an expanded image 400 is obtained by performing the expansion process for the character "A" 300 in the circumscribed rectangle 310. This process is performed to enhance the precision in decoding information by expanding a contact range between the pixel block and the circumscribed rectangle.

Figure 5:
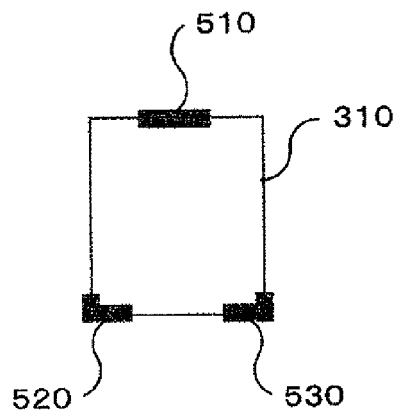
FIG. 5 is an explanatory diagram illustrating contact portions between the circumscribed rectangle and the expanded pixel block.
Figure 6:
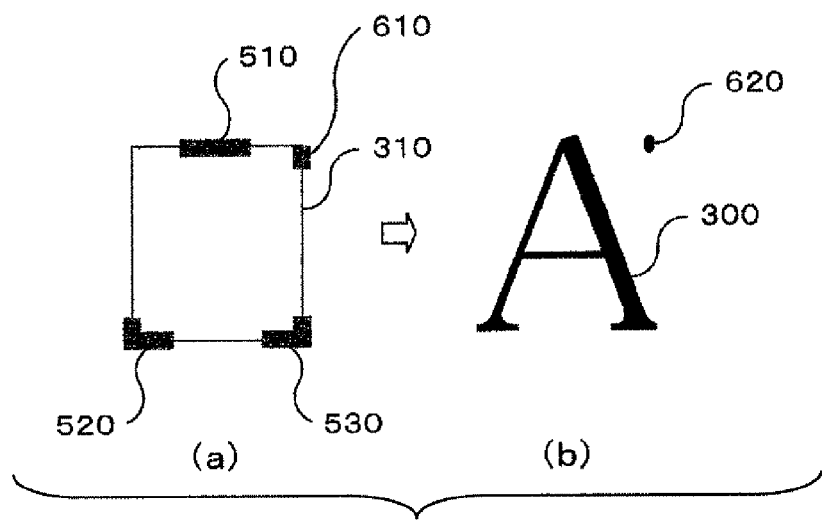
FIG. 6 is an explanatory diagram illustrating an example of a process of embedding information.

In step S208, the circumscribed-portion counting module 140 counts contact portions between the circumscribed rectangle extracted in step S204 and the pixel block expanded in step S206. As shown in FIG. 5, three contact portions 510, 520, and 530 are obtained.

In step S210, the circumscribed-portion counting module 140 determines as to whether or not the target pixel block (pixel block in question) is suitable for embedding information. If the circumscribed-portion counting module 140 determines that the target pixel block is suitable, the flow proceeds to step S212. Otherwise, the flow returns to step S204. In determining as to whether or not the target pixel block is suitable for embedding information, if the number of contact portions between the circumscribed rectangle and the expanded image lump is equal to 1 (if the entire pixel block is in contact with the circumscribed rectangle), it is determined that the pixel block is not suitable. This is because there is no position to which a black pixel for embedding information is added. For example, information is not embedded in a character "-" and a character " ".

In step S212, the information embedding module 150 performs a process of embedding information in the pixel block. Specifically, for example, when information "0" is embedded, a black pixel area is added so that the number of contact portions becomes an even number. Also, when information "1" is embedded, a black pixel area is added so that the number of contact portions becomes an odd number. Accordingly, as shown in FIG. 6(a), when information "0" is embedded in the character "A" 300, since the original number of contact portions is 3 (contact portions 510, 520, and 530), a new contact position 610 which is the black pixel area is added to make the number of contact portions be even. Then, a contraction process is performed for the new contact position 610 to generate an information image 620 shown in FIG. 6(b). In the information decoding, the expansion process will be performed for the image information 620. Therefore, the information image may be made to have the minimum size which can be read by a scanner Also, when the pixel block has the same number of contact portions as the information to be embedded, no process is performed in step S212. In this case, information "0" or "1" is embedded without any processing. Therefore, only when information opposite to information that is decoded from an image being in a non-processed state is to be embedded, the character is processed. The number of pixel blocks to be processed becomes about a half in probability in comparison with a method of processing all the pixel blocks. As a result, the unpleasant feeling is hardly generated from the pixel block, and it is suitable for making it difficult to recognize the embedding of information. The position in which information is embedded can be specified from the circumscribed rectangle. Thus, the number of contact portions between the circumscribed rectangle and the pixel block is not changed even when modification such as enlargement and reduction is performed for the image.

In step S214, it is determined as to whether or not the above-mentioned processes are performed for all the pixel blocks in the image. When the processes are performed for all the pixel blocks, the flow proceeds to step S216. Otherwise, the flow returns to step S204.

Step S216, the image output module 170 outputs the image having information embedded therein.

Figure 7:
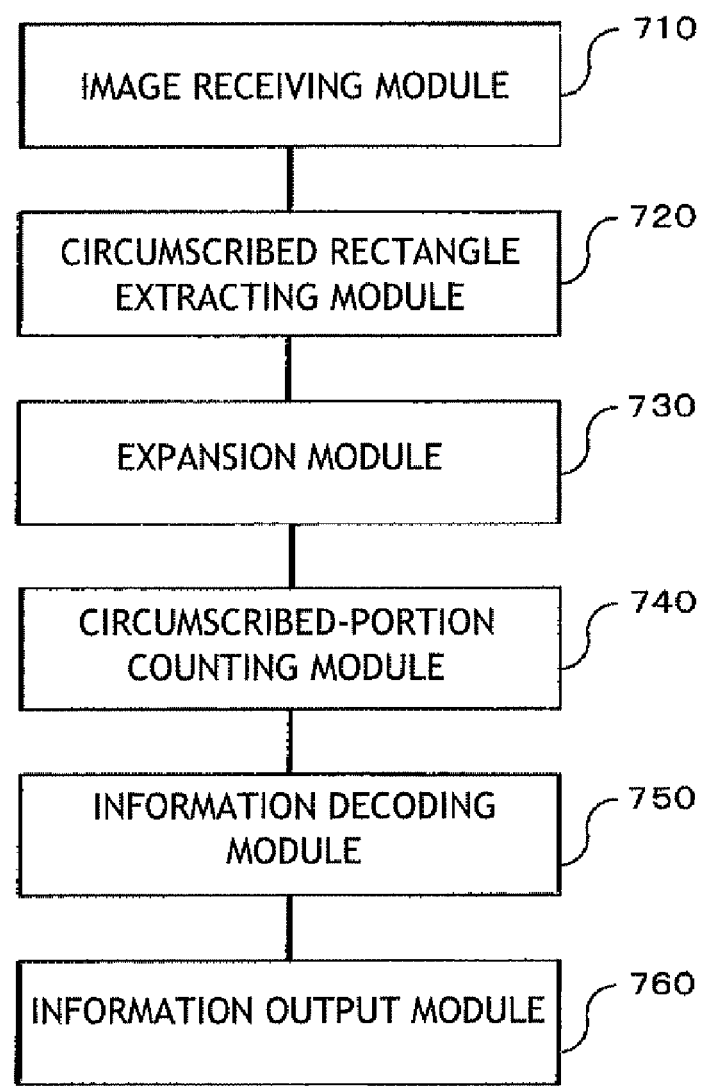
FIG. 7 is a module configuration diagram conceptually showing a configuration example of an exemplary embodiment (information decoding apparatus) of the invention.

FIG. 7 is a module configuration diagram conceptually showing a configuration example of an exemplary embodiment (information decoding apparatus) of the invention. The information decoding apparatus analyzes an image in which information is embedded by the information embedding apparatus, and extracts the embedded information.

The information decoding apparatus includes an image receiving module 710, a circumscribed rectangle extracting module 720, an expansion module 730, a circumscribed-portion counting module 740, an information decoding module 750, and an information output module 760.

The image receiving module 710 is connected to the circumscribed rectangle extracting module 720 and has the same function as the image receiving module 110 of the information embedding apparatus.

The circumscribed rectangle extracting module 720 is connected to the image receiving module 710 and the expansion module 730 and has the same function as the circumscribed rectangle extracting module 120 of the information embedding apparatus.

The expansion module 730 is connected to the circumscribed rectangle extracting module 720 and the circumscribed-portion counting module 740 and has the same function as the expansion module 130 of the information embedding apparatus.

The circumscribed-portion counting module 740 is connected to the expansion module 730 and the information decoding module 750 and has the same function as the circumscribed-portion counting module 140 of the information embedding apparatus.

The information decoding module 750 is connected to the circumscribed-portion counting module 740 and the information output module 760. The information decoding module 750 receives the number of circumscribed portions from the circumscribed-portion counting module 740. The information decoding module 750 decodes the embedded information and sends the decoded information to the information output module 760. For example, when the number of contact portions is odd, the information decoding module 750 obtains the embedded information "1". Also, when the number of contact portions is even, the information decoding module 750 obtains the embedded information "0".

The information output module 760 is connected to the information decoding module 750. The information output module 760 receives the information decoded by the information decoding module 750 and outputs the information. The outputting of information includes sending the information to an output device such as a display of the information decoding apparatus and transmitting the information to another information processing apparatus.

Operations and functions will be described now.

Figure 8:
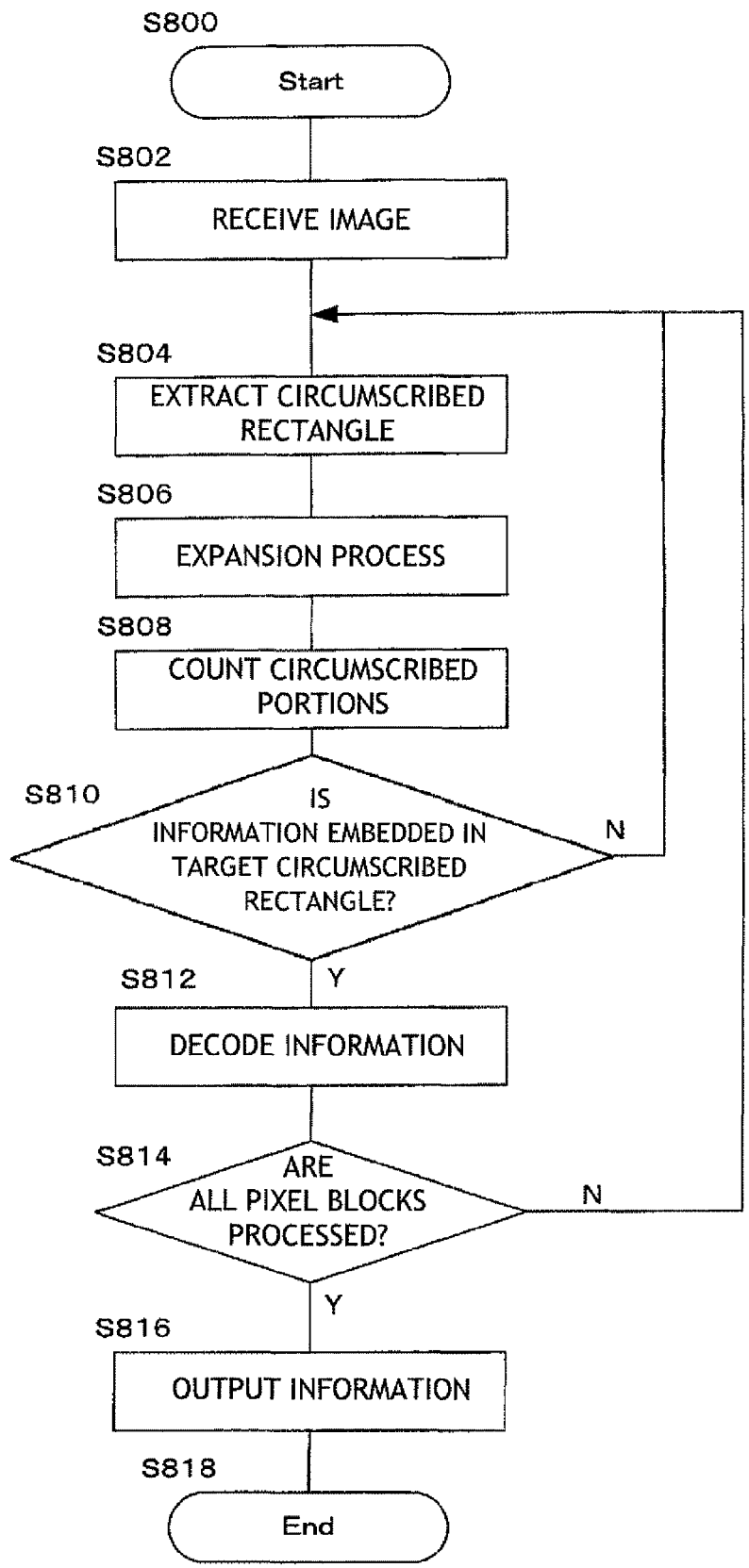
FIG. 8 is a flowchart illustrating processes performed by the information decoding apparatus.

An operation of the information decoding apparatus is described with reference to the flowchart shown in FIG. 8.

Figure 2:
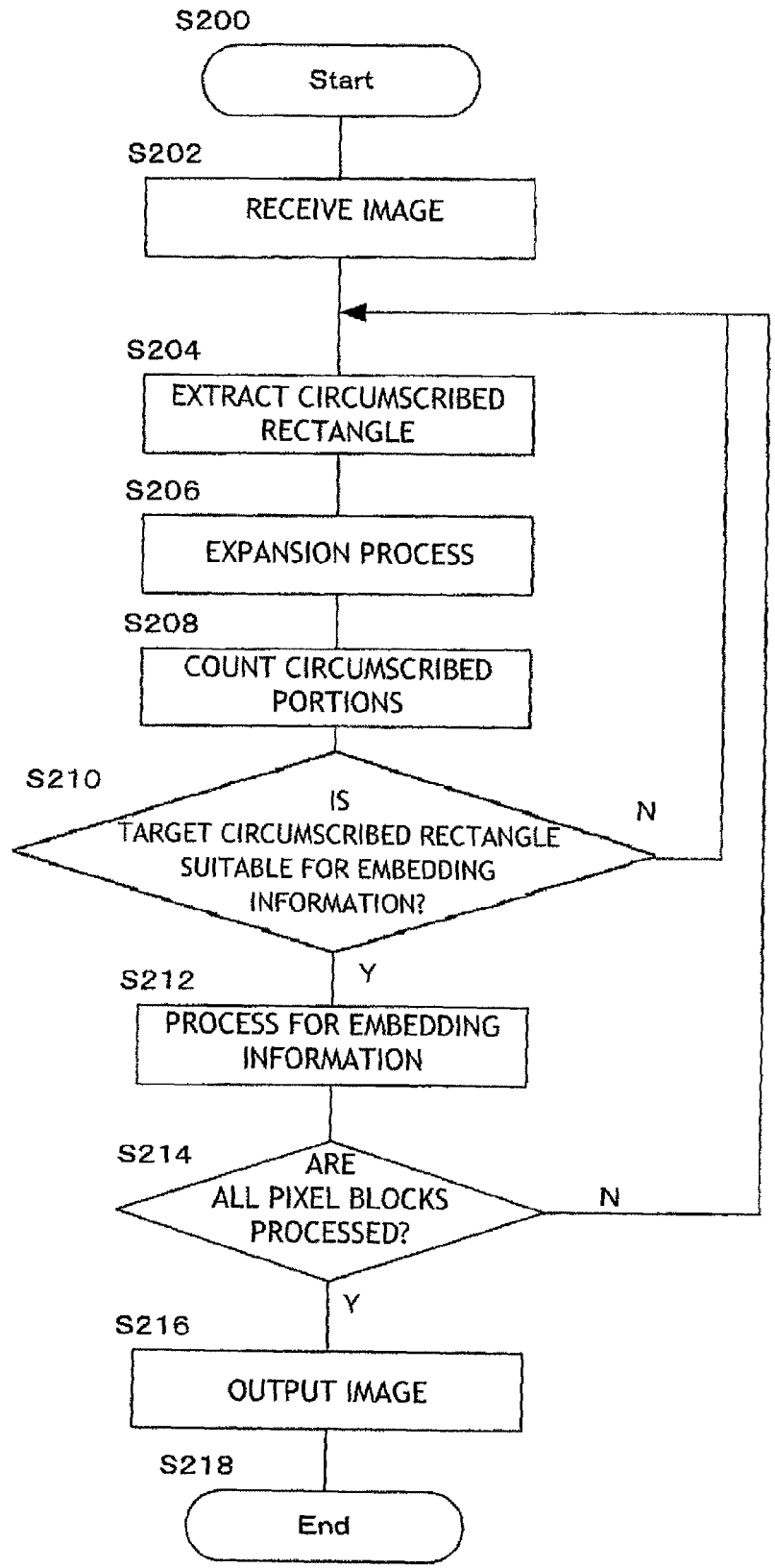
FIG. 2 is a flowchart illustrating processes performed by the information embedding apparatus.
Figure 3:
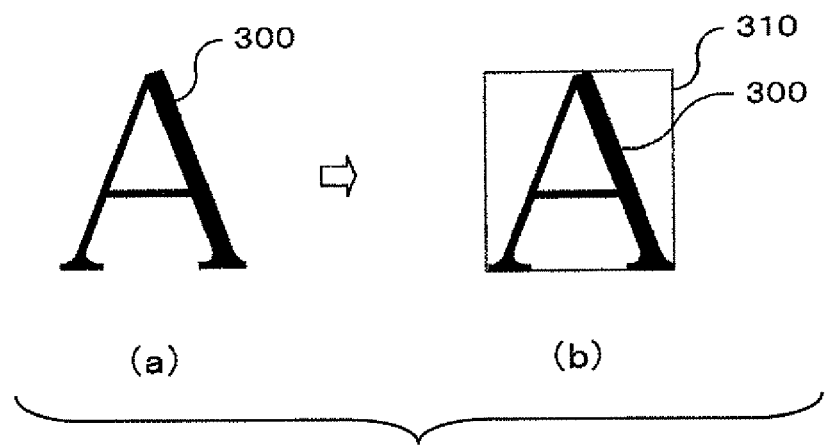
FIG. 3 is a diagram illustrating an example of a process of extracting a circumscribed rectangle.

The processes of steps S800 to S808 are the same as the processes of steps S200 to S208 in the flowchart shown in FIG. 2.

In step S810, the circumscribed-portion counting module 740 determines as to whether or not information is embedded in a target pixel block (a pixel in question). If information is embedded in the pixel block, the flow proceeds to step S812. Otherwise, the flow returns to step S804. In determining as to whether or not information is embedded in the pixel block, if the number of contact portions between the circumscribed rectangle and the expanded image lump is equal to 1 (when the entire pixel block is in contact with the circumscribed rectangle), it is determined that the pixel block is not suitable. For example, information is not embedded in a character "−" and a character "|".

In step S812, the information decoding module 750 decodes the embedded information based on the number of circumscribed portions counted in step S808. For example, when the number of contact portions is odd, the information decoding module 750 obtains the embedded information "1". Also, when the number of contact portions is even, the information decoding module 750 obtains the embedded information "0".

In step S814, it is determined as to whether the above-mentioned processes are performed for all the pixel blocks in the image. If the processes are performed for all the pixel blocks, the flow proceeds to step S816. Otherwise, the flow returns to step S804.

Step S816, the image output module 760 outputs the image having information embedded therein.

Figure 9:
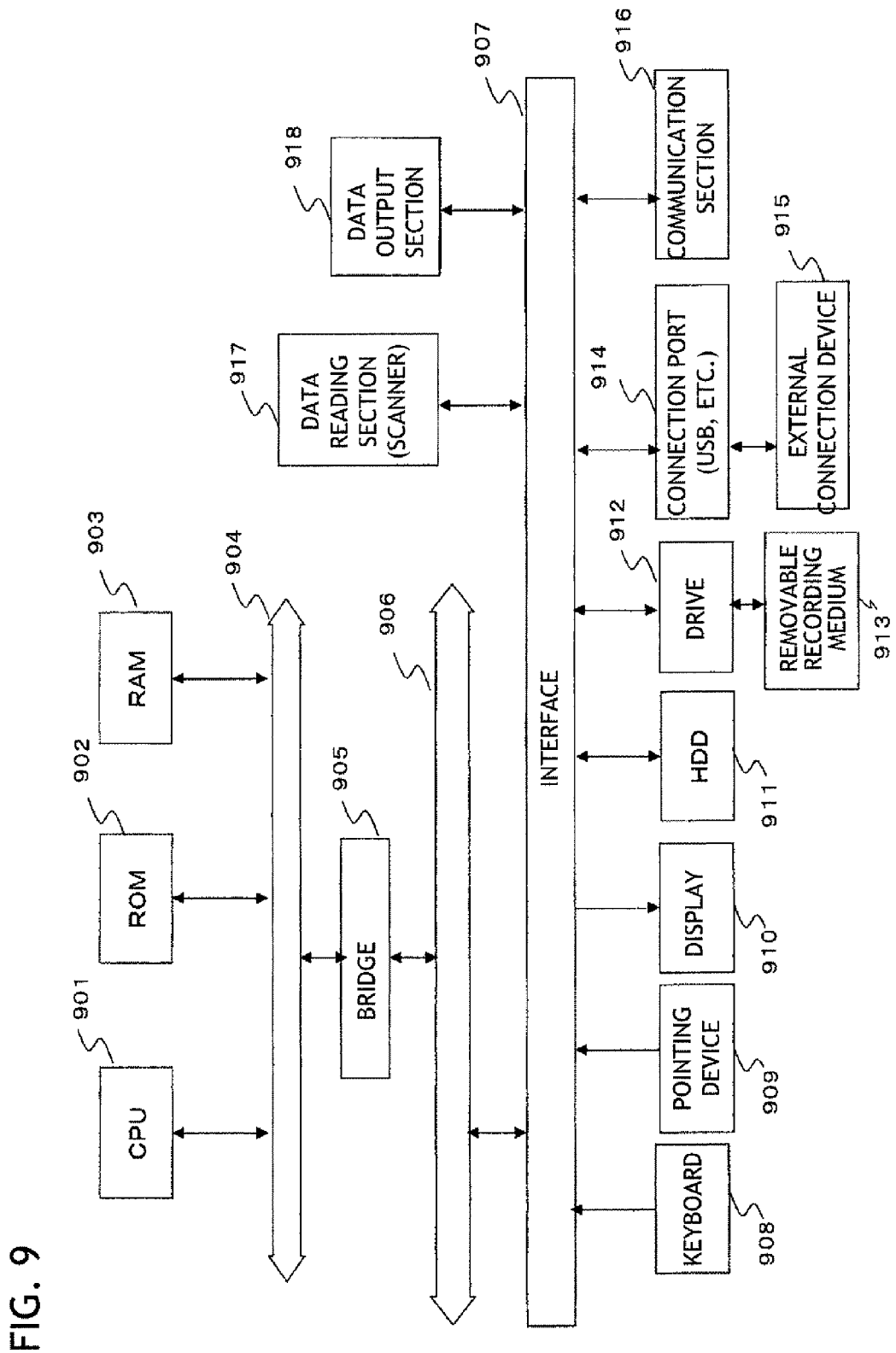
FIG. 9 is a block diagram illustrating the hardware configuration of a computer for embodying the exemplary embodiment.

The hardware configuration of this exemplary embodiment will be described with reference to FIG. 9. The configuration shown in FIG. 9 is embodied, for example, by a personal computer (PC) or the like. Here, the hardware configuration includes a data reading section 917 such as a scanner and a data output section 918 such as a printer.

A CPU (Central Processing Unit) 901 serves as a controller performing processes based on computer programs having execution sequences of various modules described in the above-mentioned exemplary embodiment, such as the image receiving module 110, the circumscribed rectangle extracting module 120, the expansion module 130, the circumscribed-portion counting module 140, the information embedding module 150, and the information decoding module 750, described therein.

A ROM (Read Only Memory) 902 stores programs or calculation parameters used in the CPU 901. A RAM (Random Access Memory) 903 stores programs used for execution of the CPU 901 or parameters properly varying in the execution. These are connected to each other through a host computer 904 including a CPU bus.

The host bus 904 is connected to an external bus 906 such as a PCI (Peripheral Component Interconnect/Interface) bus through a bridge 905.

A keyboard 908 and a pointing device 909 such as a mouse are input devices operated by an operator. A display 910 is embodied by a liquid crystal display or a CRT (Cathode Ray Tube) and serves to display various information as texts or image information.

An HDD (Hard Disk Drive) 911 has a hard disk built therein and drives the hard disk to record or reproduce programs or information executed by the CPU 901. The hard disk serves as the information storing module 160 and stores information and the like to be embedded. The hard disk also stores various computer programs such as data processing programs.

A drive 912 reads data or programs recorded in a removable recording medium 913 such as a magnetic disk, an optical disk, a magneto-optic disk, and a semiconductor memory and supplies the data or programs to the RAM 903 connected thereto through the interface 907, the external bus 906, the bridge 905, and the host bus 904. The removable recording medium 913 can be also used as the same data recording area as the hard disk.

A connection port 914 is a port for connection to an external connection device 915 and includes a connection portion such as USB and IEEE 1394. The connection port 914 is connected to the CPU 901 through the interface 907, the external bus 906, the bridge 905, and the host bus 904. A communication section 916 is connected to a network and performs a data communication process with the outside. The data reading section 917 is embodied, for example, by a scanner and performs a process of reading a document. The data output section 918 is embodied, for example, by a printer and performs a process of outputting document data.

The hardware configuration shown in FIG. 9 is only an example. This exemplary embodiment is not limited to the configuration shown in FIG. 9, and may have any configuration so long as it can execute the above-mentioned modules. For example, some modules may be embodied by exclusive hardware (such as an application specific integrated circuit (ASIC)), some modules may be disposed in an external system and may be connected through a communication line, or the plural systems shown in FIG. 9 may be connected to each other through a communication line so as to operate in cooperation with each other. Some modules may be mounted on a copier, a facsimile, a scanner, a printer, or a multi-function device (an image processing apparatus having two or more functions of a scanner, a printer, a copier, and a facsimile).

The information embedding apparatus and the information decoding apparatus may be combined to form an integrated information embedding/decoding apparatus. That is, the information embedding/decoding apparatus has all the modules shown in FIGS. 1 and 7. Alternatively, the image receiving module 110, the circumscribed rectangle extracting module 120, the expansion module 130, and the circumscribed-portion counting module 140 may be also used as the image receiving module 710, the circumscribed rectangle extracting module 720, the expansion module 730, and the circumscribed-portion counting module 740, respectively. A user may be made to instruct the embedding or decoding of information, and information may be embedded in an image or may be decoded from the image in accordance with the user's instruction. In addition to the instruction from the user, it may be determined as to whether or not information is embedded based on an instruction from another device. For example, when a pixel block exists in which a contact position between the pixel block and the circumscribed rectangle is an isolated point and the number of isolated points is equal to or greater than a predetermined number, it may be determined that information is embedded. When it is determined that information is embedded, the information is decoded. When it is determined that information is not embedded, the information is embedded.

In the above-mentioned exemplary embodiment, when the information of the original pixel block is different from the information to be embedded (that is, when the number of contact portions between the original image and the circumscribed rectangle does not correspond to the information to be embedded), the black pixel area is added so as to increase the number of contact portions. However, a white pixel area may be added so as to divide the contact position.

In the above-mentioned exemplary embodiment, when the black pixel area is added to embed information, the added position is any position on the circumscribed rectangle. However, in order not to overlap the contact portions with each other even if the expansion process is performed at the time of decoding information, the black pixel area may be added to a longest area among areas not in contact.

In the above-mentioned exemplary embodiment, information is embedded in each pixel block. However, the information may be embedded in one of plural pixel blocks so as to reliably embed information. For example, information may be embedded in a pixel block having a contact portion with the smallest area length among plural pixel blocks, or information may be embedded in a pixel block having the smallest number of contact portions among plural pixel blocks.

The expansion process may be differently performed depending on the size of the target pixel block. That is, the number of pixels to be expanded may be variable depending on the size of the target pixel block. Specifically, in order to reduce the influence of noise, the number of pixels to be expanded may be made as many as possible when the pixel block has a large size.

In the above-mentioned exemplary embodiment, the pixel block is expanded by the expansion module 130 (730), but this process may not be performed. That is, the circumscribed rectangle extracting module 120 (720) sends the extracted circumscribed rectangle of the pixel block to the circumscribed-portion counting module 140 (740) and the circumscribed-portion counting module 140 (740) counts the contact portions between the circumscribed figure extracted by the circumscribed rectangle extracting module 120 (720) and the pixel block in the circumscribed figure.

In the above-mentioned exemplary embodiment, when the information "0" it to be embedded, the number of contact portions is made to be even. Also, when the information "1" is to be embedded, the number of contact portions is made to be odd. However, the condition may be inverted.

The above-mentioned program may be stored in a recording medium or the program may be provided through communication means. In this case, for example, the above-mentioned program may be embodied as an invention of "computer-readable recording medium having a program recorded thereon".

The "computer-readable recording medium having a program recorded thereon" means a recording medium on which a program is recorded, which is readable by a computer, and which is used for installation, execution, and circulation of programs.

Examples of the recording medium include a digital versatile disk (DVD) such as "DVD-R, DVD-RW, and DVD-RAM" of which the standard is defined in a forum for DVD and "DVD+R and DVD+RW" of which the standard is defined as DVD+RW, a compact disk (CD) such as a read only memory (CD-ROM), a CD recordable (CD-R), and a CD rewritable (CD-RW), a magneto-optic disk (MO), a flexible disk (FD), a magnetic tape, a hard disk, a read only memory (ROM), an electrically erasable and programmable read only memory (EEPROM), a flash memory, and a random access memory (RAM).

The above-mentioned program or a part thereof may be recorded in the recording medium and then may be conserved or circulated in that state. The program or a part thereof may be transmitted by communication using a transmission medium such as a wired communication network, a wireless communication network, or a combination thereof, which is used, for example, in a local area network (LAN), a metropolitan area network (MAN), a wide area network (WAN), the Internet, the Intranet, the Extranet, and the like, or may be transmitted with carrier waves.

The program may be a part of another program, or may be recorded in a recording medium along with another program. The program may be distributed and recorded in plural recording mediums. The program may be recorded in any method such as compression or encryption, as long as it can be reproduced.

What is claimed is:

1. An image processing apparatus comprising:
    an extraction unit that extracts a circumscribed figure of a pixel block in an image;
    a counting unit that counts contact portions between the circumscribed figure extracted by the extraction unit and the pixel block; and
    an information embedding unit that embeds information to be embedded by adjusting a number of the contact portions between the pixel block and the circumscribed figure extracted by the extraction unit based on the number of contact portions counted by the counting unit and the information to be embedded.

2. An image processing apparatus comprising:
    an extraction unit that extracts a circumscribed figure of a pixel block in an image;
    a counting unit that counts contact portions between the circumscribed figure extracted by the extraction unit and the pixel block; and
    an information decoding unit that decodes embedded information based on the number of contact portions counted by the counting unit.

3. An image processing apparatus comprising:
    an extraction unit that extracts a circumscribed figure of a pixel block in an image;
    a counting unit that counts contact portions between the circumscribed figure extracted by the extraction unit and the pixel block;
    an information embedding unit that embeds information to be embedded by adjusting the number of contact portions between the pixel block and the circumscribed figure extracted by the extraction unit based on the number of contact portions counted by the counting unit and the information; and
    an information decoding unit that decodes the embedded information based on the number of contact portions counted by the counting unit.

4. The image processing apparatus according to claim 1, further comprising:
    an expansion unit that expands the pixel block, wherein
    the counting unit counts the contact portions between the circumscribed figure extracted by the extraction unit and the pixel block expanded by the expansion unit.

5. The image processing apparatus according to claim 2, further comprising:
    an expansion unit that expands the pixel block, wherein
    the counting unit counts the contact portions between the circumscribed figure extracted by the extraction unit and the pixel block expanded by the expansion unit.

6. The image processing apparatus according to claim 3, further comprising:
    an expansion unit that expands the pixel block, wherein
    the counting unit counts the contact portions between the circumscribed figure extracted by the extraction unit and the pixel block expanded by the expansion unit.

7. A computer-readable medium storing a program that causes a computer to execute image processing, the image processing comprising:
    extracting a circumscribed figure of a pixel block in an image;
    counting contact portions between the extracted circumscribed figure and the pixel block; and
    embedding information to be embedded by adjusting a number of the contact portions between the pixel block and the extracted circumscribed figure based on the counted number of contact portions and the information to be embedded.

8. A computer-readable medium storing a program that causes a computer to execute image processing, the image processing comprising:
    extracting a circumscribed figure of a pixel block in an image;
    counting contact portions between the extracted circumscribed figure and the pixel block; and
    decoding embedded information based on the counted number of contact portions.

9. A computer-readable medium storing a program that causes a computer to execute image processing, the image processing comprising:
    extracting a circumscribed figure of a pixel block in an image;
    counting contact portions between the extracted circumscribed figure and the pixel block;
    embedding information to be embedded by adjusting the number of contact portions between the pixel block and the extracted circumscribed figure based on the counted number of contact portions and the information; and
    decoding the embedded information based on the counted number of contact portions.

* * * * *